(12) United States Patent
Prein

(10) Patent No.: US 8,198,990 B2
(45) Date of Patent: Jun. 12, 2012

(54) TOUCH-SENSITIVE FRONT PANEL FOR A TOUCH SCREEN

(75) Inventor: Olaf Prein, Luegde-Rischenau (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 371 days.

(21) Appl. No.: 12/508,779

(22) Filed: Jul. 24, 2009

(65) Prior Publication Data

US 2010/0026473 A1    Feb. 4, 2010

(30) Foreign Application Priority Data

Jul. 25, 2008   (DE) .................. 10 2008 034 987

(51) Int. Cl.
*G08B 6/00* (2006.01)
(52) U.S. Cl. .................. 340/407.2; 340/407.1; 345/168; 345/173; 345/174
(58) Field of Classification Search .............. 340/407.2, 340/407.1; 345/173, 168, 174; 715/702; 348/333.01
See application file for complete search history.

(56) References Cited

U.S. PATENT DOCUMENTS

| 5,747,759 | A  | * | 5/1998 | Lochmahr et al. | ............ 200/5 R |
| 2004/0075676 | A1 | | 4/2004 | Rosenberg et al. | |
| 2007/0013662 | A1 | * | 1/2007 | Fauth | ............ 345/168 |
| 2007/0152982 | A1 | | 7/2007 | Kim et al. | |
| 2011/0291956 | A1 | * | 12/2011 | Mann et al. | ............ 345/173 |
| 2011/0292268 | A1 | * | 12/2011 | Mann et al. | ............ 348/333.01 |

FOREIGN PATENT DOCUMENTS

DE    100 46 099 A1    4/2002
DE    10340188 A1    4/2005

OTHER PUBLICATIONS

"German Office Action for German International Application No. 10 2008 034 987.9-53", Feb. 17, 2011, Publisher: German Office Action, Published in: DE.
German Office Action, dated Feb. 5, 2009, German Patent Office, German Application No. 10 2008 034 987.9.
Bergbauer, "DE Application No. 10 2008 034 987 Office Action", Jun. 27, 2009, Publisher: Deutsches Patent-und Markenamt, Published in: DE.

* cited by examiner

*Primary Examiner* — Daryl Pope
(74) *Attorney, Agent, or Firm* — DeMont & Breyer, LLC

(57) ABSTRACT

The invention relates to a touch-sensitive front panel for a touch screen with a touch-insensitive front-panel area (107) and a touch-sensitive front-panel area (103) that can be distinguished haptically from the touch-insensitive front-panel area (107) or from an additional touch-sensitive front-panel area (105).

11 Claims, 3 Drawing Sheets

TOUCH-SENSITIVE FRONT PANEL FOR A TOUCH SCREEN

FIELD OF INVENTION

The present invention relates to the field of touch screens.

BACKGROUND OF THE INVENTION

Modern industrial machines are often operated with the help of touch screens, or so-called touch displays, which feature, for example, an arrangement of touch-sensitive front-panel areas. The touch-sensitive front-panel areas could be constructed and provided, for example, as short-travel keys or click buttons for initiating, when contacted, a triggering of a process assigned to the touch-sensitive front-panel area. However, a disadvantage in such touch displays is that, particularly under poor lighting conditions, the likelihood of incorrect activation increases.

SUMMARY OF THE INVENTION

The task of the present invention is to create a concept for touch screens with which the likelihood of incorrect activation is reduced.

The invention is based on the knowledge that the likelihood of incorrect activation can be reduced if a user of a touch display or a touch screen is given haptically detectable feedback via a touched area. In this way, the user could operate the touch screen "blindly," so to speak, which leads to a reduction in the likelihood of incorrect activation.

The invention relates to a touch-sensitive front panel for a touch screen with a touch-insensitive front-panel area and a touch-sensitive front-panel area that can be distinguished haptically from the touch-insensitive front-panel area or from an additional touch-sensitive front-panel area.

According to one embodiment, the touch-sensitive front-panel area or the additional touch-sensitive front-panel area is sensitive to pressure.

According to one embodiment, a vibration device is associated with the touch-sensitive front-panel area or with the additional touch-sensitive front-panel area, or the touch-sensitive front-panel area or the additional touch-sensitive front-panel area comprises a vibration device that is constructed to vibrate the touch-sensitive front-panel area or the additional touch-sensitive front-panel area when this area is touched, in particular to vibrate it in a way that a user can detect.

According to one embodiment, the touch-sensitive front-panel area or the additional touch-sensitive front-panel area comprises a raised section, in particular, an embossed section.

According to one embodiment, the touch-sensitive front-panel area or the additional touch-sensitive front-panel area comprises a convex area or a concave area, wherein the convex area or concave area is at least partially surrounded by a border bead.

According to one embodiment, the touch-insensitive front-panel area is smooth or comprises haptic features that differ from the haptic features of the touch-sensitive front-panel area or the additional touch-sensitive front-panel area.

According to one embodiment, the touch-sensitive front panel comprises an acoustic signal tone device that is constructed to indicate acoustically the contacting of the touch-sensitive front-panel area by means of a signal tone associated with the touch-sensitive front-panel area.

According to one embodiment, the touch-sensitive front panel comprises a plurality of touch-sensitive front-panel areas and a plurality of touch-insensitive front-panel areas, wherein the plurality of touch-sensitive front-panel areas can be distinguished haptically from the plurality of touch-insensitive front-panel areas and/or from each other.

According to one embodiment, the touch-sensitive front-panel area or the additional touch-sensitive front-panel area comprises a display layer, a touch-sensitive, in particular, a pressure-sensitive, layer arranged on the display layer, a vibration layer arranged on the touch-sensitive layer, and a haptic layer arranged on the vibration layer.

The invention further relates to a touch screen with a touch-sensitive front panel according to the present invention. The touch-sensitive front panel forms an operating interface between the electronics arranged, for example, in the screen, and a user. The electronics arranged in the screen are provided, for example, for the detection of contact with the touch-sensitive front-panel areas and, for example, for the generation or output of machine control signals associated with these front-panel areas.

BRIEF DESCRIPTION OF THE DRAWINGS

Additional embodiments of the invention will be explained in greater detail with reference to the accompanying drawings. Shown are.

DETAILED DESCRIPTION

Figure 1:
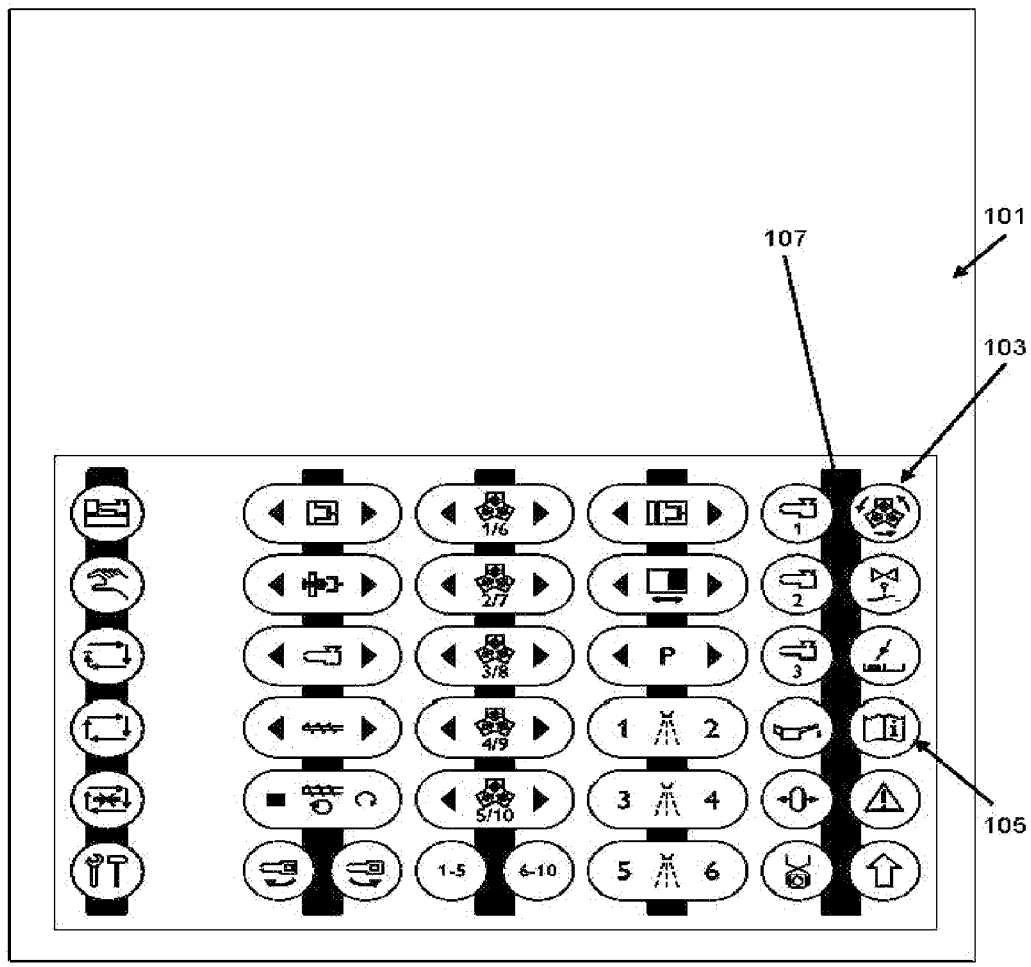
FIG. 1, a touch-sensitive front panel for a touch-sensitive screen.

FIG. 1 shows a touch-sensitive front panel 101 for a touch screen with, for example, a first touch-sensitive front-panel area 103 and a second touch-sensitive front-panel area 105 of a plurality of touch-sensitive front-panel areas that can be arranged in lines and rows. In addition, a touch-insensitive front-panel area 107 could be arranged, for example, between two columns with touch-sensitive front-panel areas. Furthermore, a touch-insensitive front-panel area could be provided between every pair of adjacent, touch-sensitive front-panel areas. As shown, for example, in FIG. 1, a process that is triggered when the corresponding touch-sensitive front-panel area 103, 105 is touched is associated with each of the touch-sensitive front-panel areas 103, 105, for example, by means of an icon.

The touch-sensitive front-panel areas, or only a few of the touch-sensitive front-panel areas, can preferably be distinguished haptically from the touch-insensitive front-panel areas of the front panel shown in FIG. 1, so that when such a touch-sensitive front-panel area is touched a user is given, for example, not only optical feedback, but also felt feedback confirming that, for example, the finger of the user activating this front-panel area is at the correct position and touches the desired touch-sensitive front-panel area.

Preferably, the touch-sensitive front-panel areas have a profile that is, for example, integrated and tactile and that can be, for example, a border bead or a raised section or an embossed section. In addition, the haptic distinguishability can be guaranteed, for example, by a vibration pulse that could be triggered when a touch-sensitive front-panel area is touched. At the same time, additional protection for the front panel could be achieved through an additional embossed section or through the provision of raised sections.

By means of the haptic distinguishability of the touch-sensitive front-panel areas from, for example, the touch-insensitive front-panel areas or also from each other, a user of the front panel could operate this panel even under difficult viewing conditions. In addition, the activation of the selected function could be shown on a front panel forming a display, for example by an animation and/or color changes. For this purpose, haptic features such as, for example, raised sections could be transparent or partially transparent, so that the view of the underlying display is not negatively affected or is negatively affected only to a justifiable extent.

According to another embodiment, in addition to a signal pulse, for example, a vibration pulse, acoustic feedback could also be provided that acoustically indicates to the user the activation of the appropriate touch-sensitive front-panel area. This functionality could be implemented for the entire front-panel area, or also for only sub-areas of the front panel.

For setting an operating level, for example, RFID technology (RFID: Radio Frequency Identification) or comparable technology could be used, wherein an associated reading unit could be integrated into the front panel. In addition, a digital camera in the form of a CCD chip (CCD: Charge-Coupled Device) could be provided for operating the front panel or front-panel areas.

The touch-sensitive front-panel areas are preferably sensitive to pressure, and could also be constructed as short-travel keys or so-called click buttons that generate a clicking sound when touched.

Figure 2:
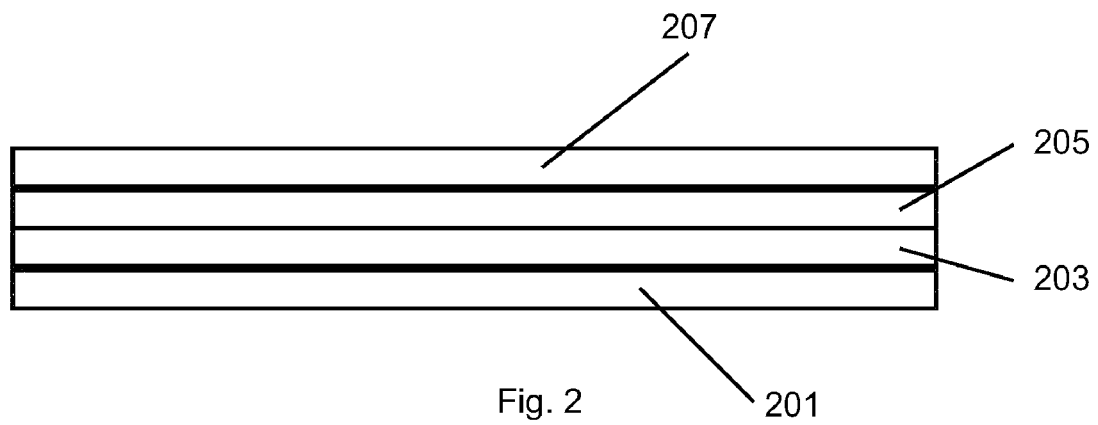
FIG. 2, a layout of a touch-sensitive front panel.

FIG. 2 shows a structure of a touch-sensitive front-panel area with a display layer 201, a touch-sensitive layer 203 arranged on this display layer, a vibration layer 205 arranged on the touch-sensitive layer 203, and also a haptic layer 207 arranged on the vibration layer 205. The haptic layer 207 comprises, for example, haptically detectable features, such as embossed sections, raised sections, recesses, borders, or other haptic features that can be distinguished and detected when touched. The vibration layer 205 could be vibrated, for example, through the use of the piezoelectric effect or through a direct mechanical effect.

Figure 3:
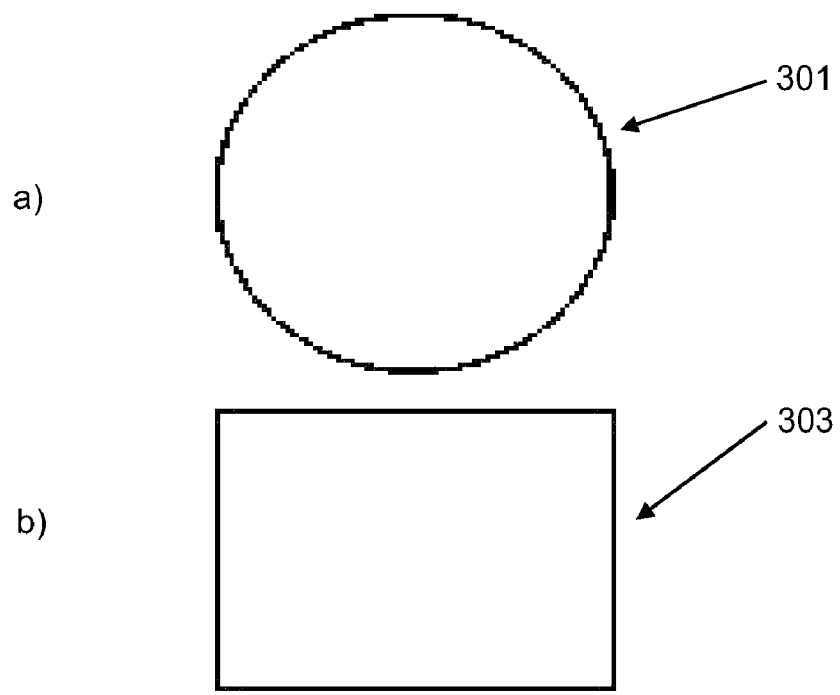
FIG. 3A, a configuration of a touch-sensitive front-panel area.
FIG. 3B, a configuration of a touch-sensitive front-panel area.

In FIGS. 3A and 3B, a circular touch-sensitive front-panel area 301 and also a rectangular touch-sensitive front-panel area 303 are shown as examples.

Figure 4:
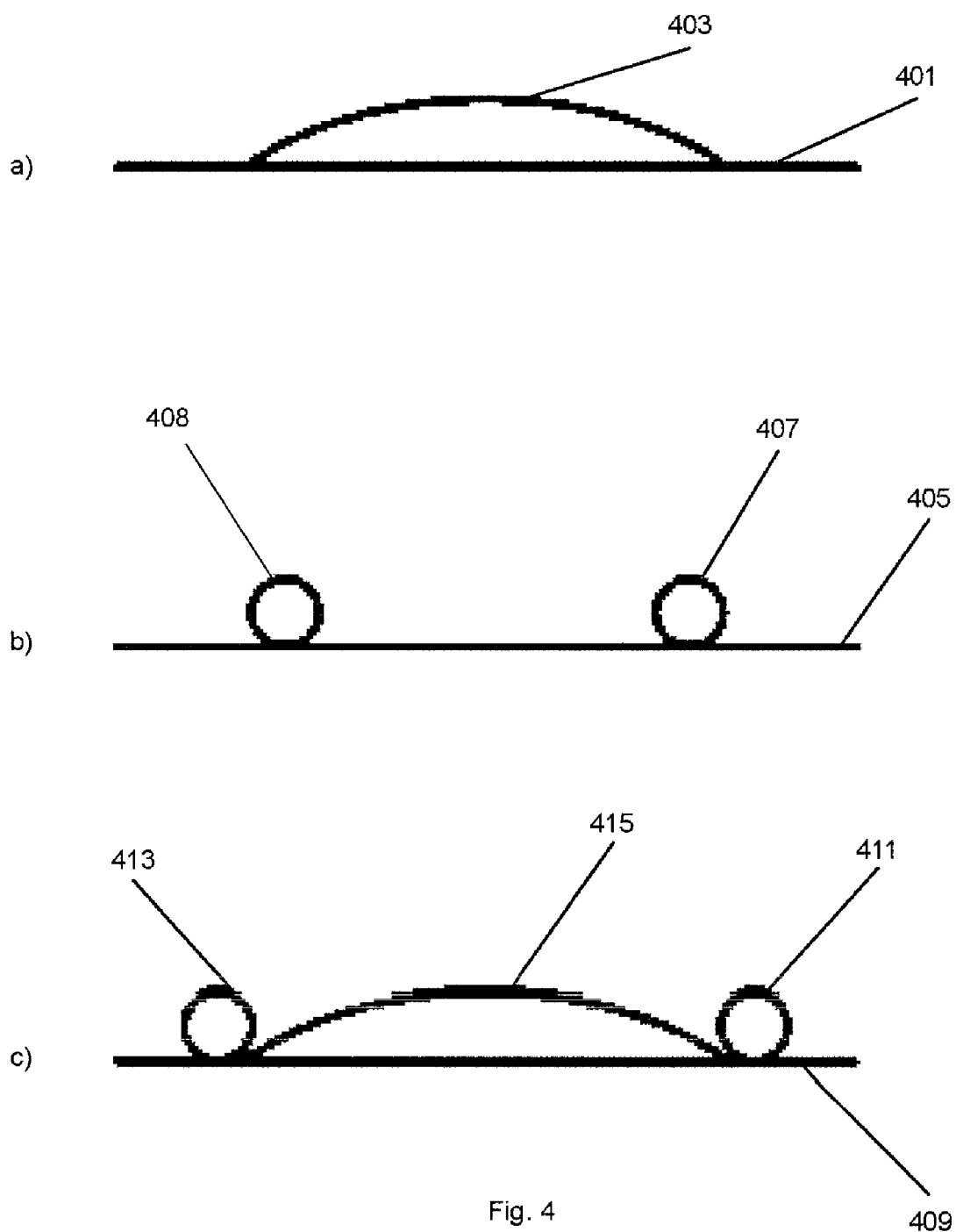
FIG. 4A, a cross section of a touch-sensitive front-panel area.
FIG. 4B, a cross section of a touch-sensitive front-panel area.
FIG. 4C, a cross section of a touch-sensitive front-panel area.

FIG. 4A shows a cross section of a touch-sensitive front-panel area with a sub-layer 401, for example, a film, and also a convex raised section 403 arranged on the sub-layer 401.

FIG. 4B shows a cross section of a touch-sensitive front-panel area with a sub-layer 405, for example, a film, on which there are bead-shaped sections 407 and 408.

FIG. 4C shows a cross section of a touch-sensitive front-panel area with a sub-layer 409, for example, a film, on which there are bead-shaped sections 411 and 413 that at least partially enclose or surround a convex raised section 415 arranged on the sub-layer 409.

What is claimed is:
1. Touch-sensitive front panel for a touch screen, comprising:
 a touch-insensitive front-panel area (107) and
 a touch-sensitive front-panel area (103) that can be distinguished haptically from the touch-insensitive front-panel area (107) or from an additional touch-sensitive front-panel area (105), wherein the touch-sensitive front-panel area (103) or the additional touch-sensitive front-panel area (105) comprises a convex area or a concave area, wherein the convex area or the concave area is at least partially surrounded by a border bead.

2. Touch-sensitive front panel according to claim 1, wherein the touch-sensitive front-panel area (103) or the additional touch-sensitive front-panel area (105) is sensitive to pressure.

3. Touch-sensitive front panel according to claim 1, wherein a vibration device is associated with the touch-sensitive front-panel area (103) or with the additional touch-sensitive front-panel area (105) or wherein the touch-sensitive front-panel area (103) or the additional touch-sensitive front-panel area (105) comprises a vibration device that is constructed to vibrate the touch-sensitive front-panel area (103) or the additional touch-sensitive front-panel area (105).

4. Touch-sensitive front panel according to claim 1, wherein the touch-sensitive front-panel area (103) or the additional touch-sensitive front-panel area (105) comprises a raised section.

5. Touch-sensitive front panel according to claim 1, wherein the touch-insensitive front-panel area (107) is smooth or has haptic features that differ from the haptic features of the touch-sensitive front-panel area (103) or those of the touch-sensitive front-panel area (105).

6. Touch-sensitive front panel according to claim 1, further comprising an acoustic signal tone device that is constructed to acoustically indicate the contact of the touch-sensitive front-panel area (103, 105) by means of a signal tone associated with the touch-sensitive front-panel area (103, 105).

7. Touch-sensitive front panel according to claim 1, comprising a plurality of touch-sensitive front-panel areas (103, 105) and a plurality of touch-insensitive front-panel areas (107), wherein the plurality of touch-sensitive front-panel areas (103, 105) can be distinguished haptically from each other or from the plurality of touch-insensitive front-panel areas (107).

8. Touch-sensitive front panel according to claim 1, wherein the touch-sensitive front-panel area (103) or the additional touch-sensitive front-panel area (105) comprises a display layer (201), a touch-sensitive layer (203) arranged on the display layer (201), a vibration layer (205) arranged on the touch-sensitive layer (203), and a haptic layer (207) arranged on the vibration layer (205).

9. Touch screen with a touch-sensitive front panel according to claim 1.

10. Touch-sensitive front panel for a touch screen, with:
 a touch-insensitive front-panel area (107) and
 a touch-sensitive front-panel area (103) that can be distinguished haptically from the touch-insensitive front-panel area (107) or from an additional touch-sensitive front-panel area (105), wherein the touch-sensitive front-panel area (103) or the additional touch-sensitive front-panel area (105) comprises a display layer (201), a touch-sensitive layer (203) arranged on the display layer (201), a vibration layer (205) arranged on the touch-sensitive layer (203), and a haptic layer (207) arranged on the vibration layer (205).

11. Touch-sensitive front panel according to claim 10, wherein the touch-sensitive front-panel area (103) or the additional touch-sensitive front-panel area (105) comprises a convex area or a concave area, wherein the convex area or the concave area is at least partially surrounded by a border bead.

* * * * *